US007351143B2

(12) United States Patent
Inoue

(10) Patent No.: US 7,351,143 B2
(45) Date of Patent: Apr. 1, 2008

(54) SYMBOL DISPLAYING UNIT FOR A GAME MACHINE

(75) Inventor: Haruo Inoue, Tokyo (JP)

(73) Assignee: Dragon Co., Ltd., Tokyo (JP)

( * ) Notice: Subject to any disclaimer, the term of this patent is extended or adjusted under 35 U.S.C. 154(b) by 825 days.

(21) Appl. No.: 10/338,656

(22) Filed: Jan. 9, 2003

(65) Prior Publication Data

US 2004/0036218 A1 Feb. 26, 2004

(30) Foreign Application Priority Data

Aug. 22, 2002 (JP) ............................ 2002-241492

(51) Int. Cl.
*A63F 13/00* (2006.01)

(52) U.S. Cl. .......................................... 463/20; 463/25

(58) Field of Classification Search ............ 273/142 R, 273/274; 463/16, 20–21
See application file for complete search history.

(56) References Cited

U.S. PATENT DOCUMENTS

| | | | | | |
|---|---|---|---|---|---|
| 4,790,537 | A | * | 12/1988 | Smyth et al. | 273/143 R |
| 5,152,529 | A | * | 10/1992 | Okada | 463/20 |
| 5,395,111 | A | * | 3/1995 | Inoue | 273/143 R |
| 5,704,835 | A | * | 1/1998 | Dietz, II | 463/20 |
| 5,752,881 | A | * | 5/1998 | Inoue | 463/20 |

* cited by examiner

*Primary Examiner*—John Hotaling
(74) *Attorney, Agent, or Firm*—Young & Thompson

(57) ABSTRACT

A first symbol and a second symbol constituting a composition symbol "horse" are arranged on an inner reel and an outer reel respectively. When the outer reel is rotated and it is determined to display the composition symbol, the inner reels of first though third reel units are stopped so as to align the first symbols at a reference position, which is set relative to a central game line. After that, the outer reels of the first through third reel units are rotated and are stopped so as to align the second symbols on the central game line. When aligning the composition symbols "horse" on the central game line, the inner reel is rotated by a predetermined angle in forward and backward directions. This operation is carried out prescribed times to perform dynamic attraction in that pupil of the horse is changed.

12 Claims, 13 Drawing Sheets

SYMBOL DISPLAYING UNIT FOR A GAME MACHINE

BACKGROUND OF THE INVENTION

1. Field of the Invention

The present invention relates to a symbol displaying unit used for a game machine and having a double structure including an outer reel and an inner reel.

2. Description of the Related Art

Some of game machines, which are a slot machine and so forth, have a symbol displaying unit built therein. As to the symbol displaying units, there are two types of a mechanical type and a video type. The mechanical type includes three reels and a driving mechanism thereof, for example. On a periphery of the reel, a plurality of symbols are arranged. The video type displays reel rotation simulated by means of a liquid-crystal-display (LCD) panel and so forth. When this kind of the symbol displaying unit is incorporated in the game machine of the slot machine and so forth, the three reels are simultaneously rotated upon starting a game. In accordance with a symbol combination displayed after stopping the reel rotation, winning or loss is determined. In a case that the symbol combination stopping along a nominated game line is a certain symbol combination preset as the winning, a predetermined number of coins are paid in accordance with a king of the winning.

Some of the symbol displaying units of the mechanical type use a double reel in which two reels of an inner reel and an outer reel are concentrically disposed. In the case of this symbol displaying unit, it is possible to compose the symbols of the outer reel and the inner reel to display the symbols through a display window as a single composition symbol. Thus, the kinds of the symbol and the winning may increase so that anticipation of the winning is effectively given to a player.

Meanwhile, in the case of the symbol displaying unit of the video type, it is possible to add attraction and so forth by using an animation prepared for each type of the game machine, besides simulating the reel rotation by performing flowing display of the symbols. By contrast, in the case of the symbol displaying unit of the mechanical type, the symbols arranged on the respective reels are fixed so that the flowing display of the symbols is merely performed. Due to this, when the symbol displaying unit of the mechanical type is incorporated in the game machine of the slot machine and so forth, the attraction is merely carried out by using a lamp and a speaker built in the game machine. Concretely, the attraction is carried out such that the lamp is turned on and the speaker generates effective sounds. In comparison with the symbol displaying unit of the video type, the symbol displaying unit of the mechanical type has a disadvantage that the attraction itself pales. This disadvantage similarly exists in the symbol displaying unit having the reel comprising the inner reel and the outer reel. Thus, with respect to the game machine using the symbol displaying unit of the mechanical type, it is difficult to arouse player's interest by the attraction.

SUMMARY OF THE INVENTION

In view of the foregoing, it is a primary object of the present invention to provide a symbol displaying unit for a game machine in which player's interest is aroused by dynamically changing a form of a symbol.

It is a second object of the present invention to provide a symbol displaying unit for a game machine in which player's interest is aroused by dynamically changing a display state of a symbol.

In order to achieve the above and other objects, the symbol displaying unit for the game machine according to the present invention comprises a plurality of reel units having several kinds of symbols arranged on peripheries of reels. The reel is rotated behind a display window corresponding thereto. Upon stopping the reel, any of the symbols arranged on the periphery thereof is displayed through the display window.

At least one of the reel units is constituted of an inner reel and a transparent outer reel. The symbols are arranged on the inner reel, and at least one symbol is arranged on the outer reel. By rotating at least one of the outer reel and the inner reel, the symbol arranged on the outer reel is combined with the symbol arranged on the inner reel to perform an animation display for dynamically changing a display state of the symbols. When the display state of the symbols is dynamically changed, a form of the symbols composed by the inner reel and the outer reel is dynamically changed, for example. In another way, a part of the symbol form is dynamically changed.

In the case that either of the outer reel and the inner reel is rotated, it is preferable to perform the animation display such that forward rotation and backward rotation of the reel are repeated predetermined times within a fixed range. Meanwhile, in a case that both of the outer reel and the inner reel are rotated, the animation display may be performed by rotating the outer reel and the inner reel in the same rotational direction or in the different direction.

According to the symbol displaying unit of the present invention, it is possible to emphasize visual attraction for a player. Further, it is also possible to afford game interests to the player.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
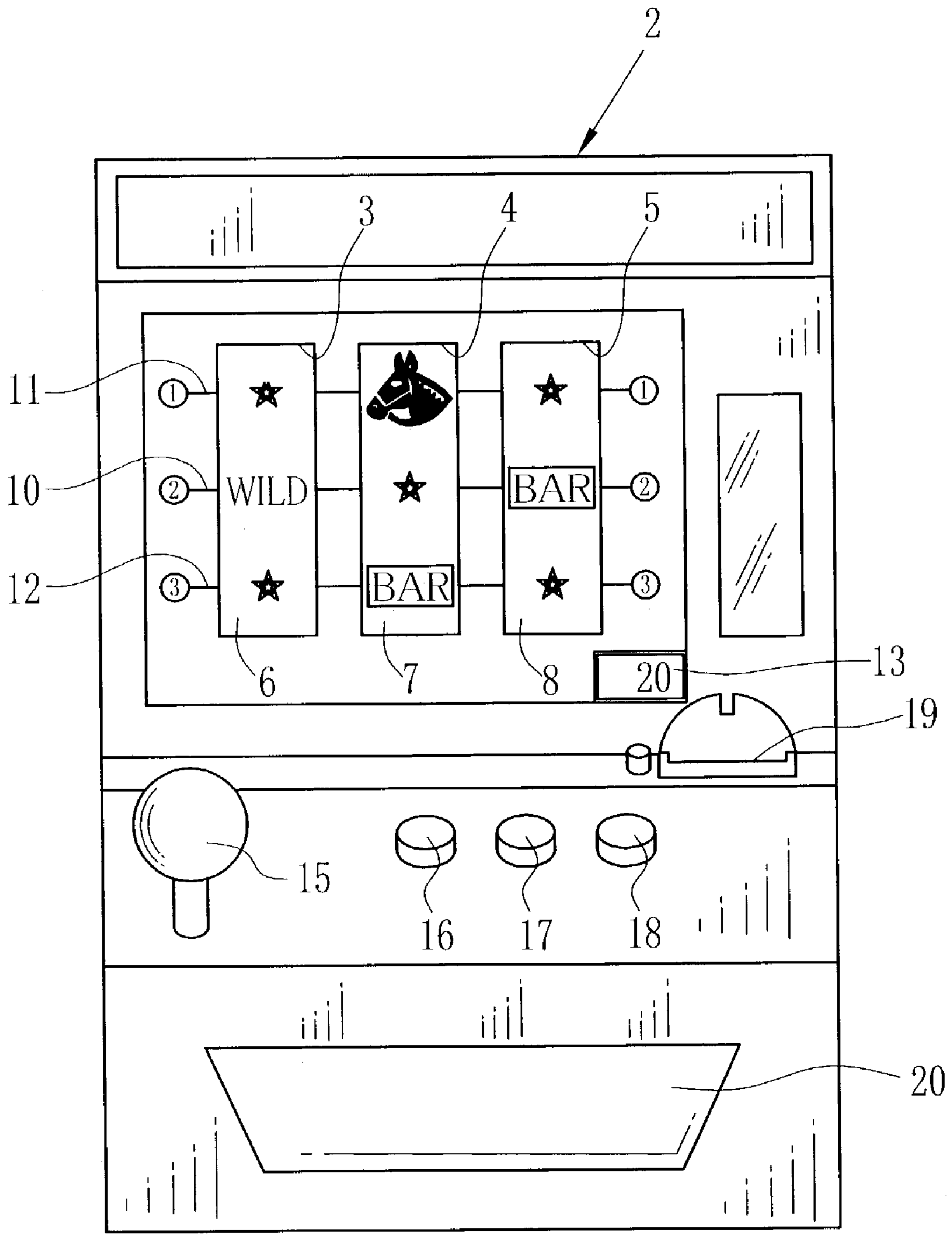
FIG. 1 is a front view showing a slot machine according to the present invention.

FIG. 1 is a front view showing a slot machine 2 using a symbol displaying unit according to the present invention. A center portion of the slot machine 2 is formed with three display windows 3 to 5. Behind the display windows 3 to 5, is disposed a symbol displaying unit 47 (see FIG. 4) of a mechanical-reel type including a first reel unit 6, a second reel unit 7 and a third reel unit 8. Through the display windows 3 to 5, it is possible to watch three symbols in a vertical direction with respect to each of the first to third reel units 6 to 8. The display windows 3 to 5 are provided with three game lines 10 to 12 horizontally extending. Incidentally, an under portion of the display windows 3 to 5 is provided with a credit-number indicator 13 for indicating a number of credited coins.

A start lever 15, a one-bet button 16, a max-bet button 17, a paying-out button 18, and a coin slot 19 are provided under the display windows 3 to 5. Betting the coins is performed such that the coins are inserted into the coin slot 19 and either of the one-bet buttons 16 and the max-bet buttons 17 is pressed. The game lines 10 to 12 may be nominated in accordance with the number of the inserted coins. Incidentally, instead of inserting the actual coin into the coin slot 19, the coins accumulated in a credit counter, which is not shown, may be betted with the one-bet button 16 and the max-bet button 17.

When the start lever 15 is operated after betting the coin, the first to third reel units 6 to 8 are simultaneously rotated. The first to third reel units 6 to 8 are stopped after a predetermined period. In accordance with a symbol combination stopping at the nominated game line when all of the reels are stopped, either of winning and loss is determined with respect to the current game. When the symbol combination corresponds to the winning, coins of a dividend number, which is determined relative to the corresponding winning, are paid out to a tray 20. The dividend number is obtained by multiplying a bet number of coins by odds.

Figure 2:
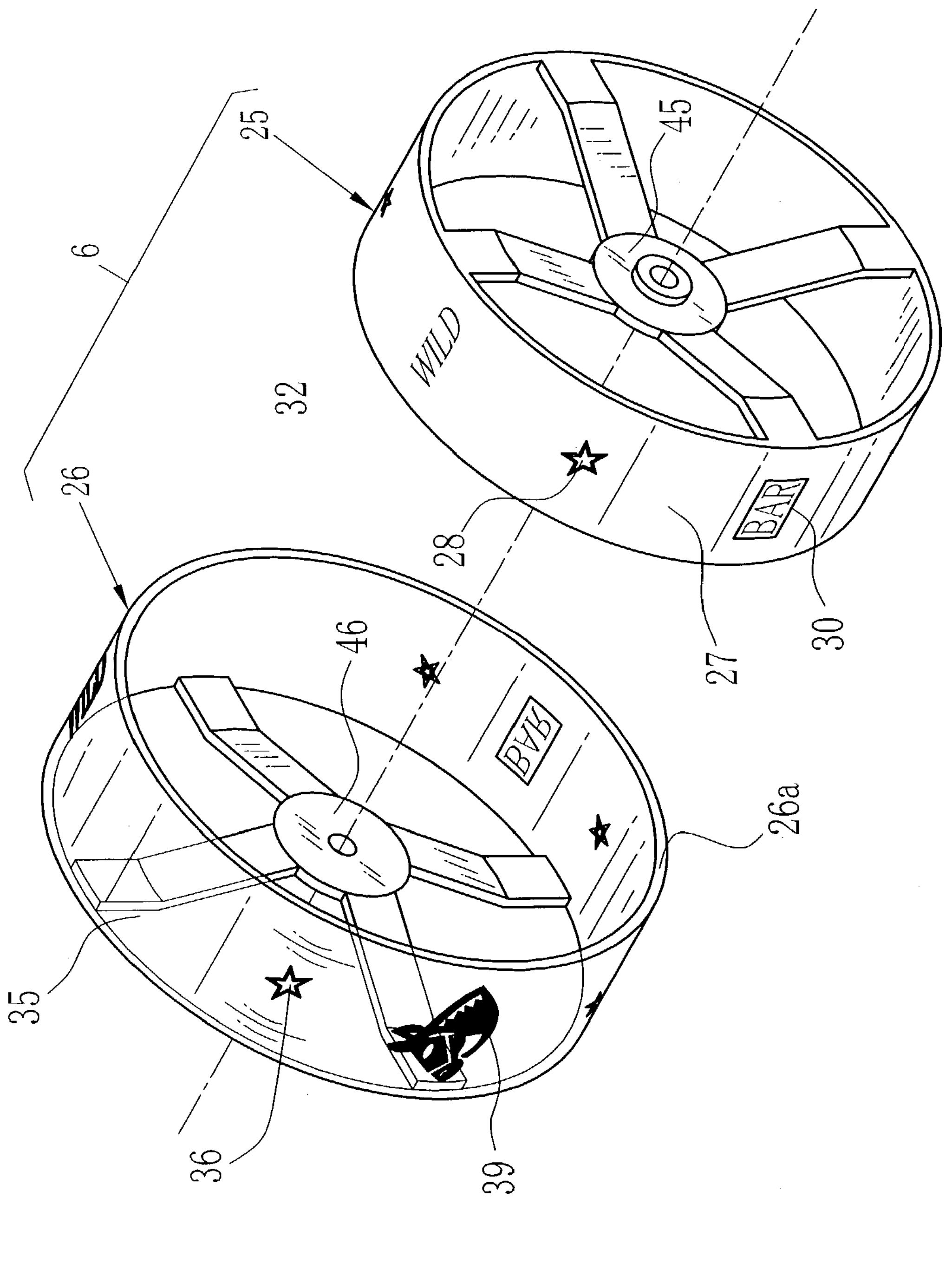
FIG. 2 is a perspective view schematically showing a structure of a first reel unit.
Figure 3:
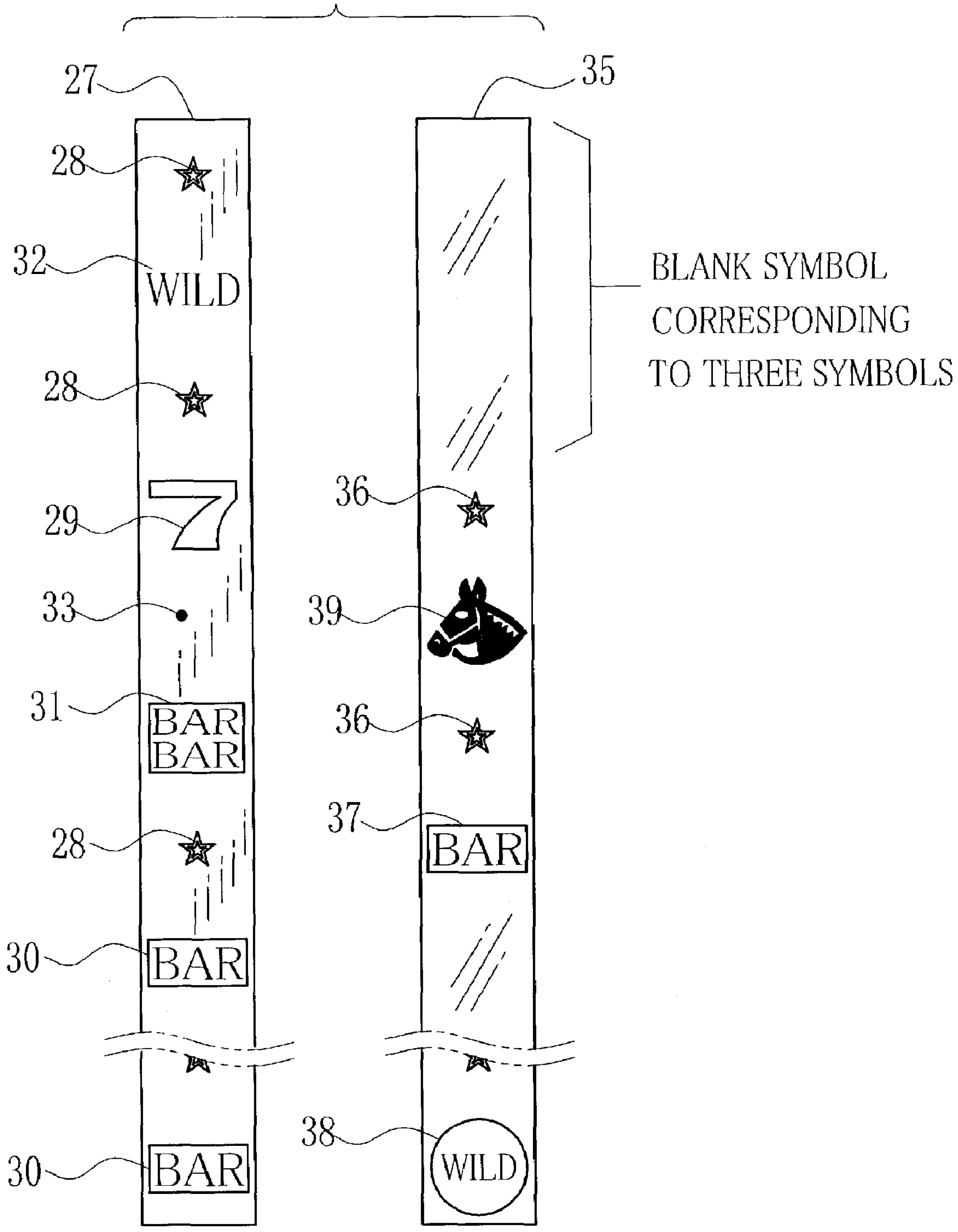
FIG. 3 is an explanatory illustration showing symbol arrangements of an inner reel and an outer reel.

Such as shown in FIGS. 2 and 3, each of the first to third reel units 6 to 8 has a double structure including an inner reel 25 and an outer reel 26. FIG. 2 shows the reel structure of the first reel unit 6. The inner reel 25 is made of a plastic material having permanence, and the whole periphery thereof is opaque white, for example. Around the periphery of the inner reel 25, is wound a symbol sheet 27 on which plural kinds of symbols are printed at predetermined intervals. The symbols include "star" 28, "7" 29, "BAR" 30, "2BAR" 31, "WILD" 32 and so forth. Incidentally, the symbol "star" 28 does not participate in the winning. A first symbol 33 is also arranged on the symbol sheet 27. The first symbol 33 is combined with a second symbol 39 of the outer reel 26, which is described later in detail, to form a composition symbol "horse" 40 (see FIG. 8).

Among the symbols, the symbol "WILD" 32 is an all-around symbol. When the symbol "WILD" 32 stops at any game line, it is possible to regard this symbol 32 as the other symbol arranged on the inner reel 25. For instance, when a symbol combination of "WILD-7-7" is displayed along the central game line after stopping the first to third reel units 6 to 8, the symbol "WILD" 32 is regarded as the symbol "7" 29 so that winning occurs. In a case that the symbol combination is "WILD-WILD-7", this symbol combination is regarded as "7-7-7". In a case that the symbol combination is "WILD-WILD-WILD", this symbol combination is especially regarded as the winning of the high odds so that a greater number of coins are paid out.

A periphery of the outer reel 26 is made of a transparent plastic as a reel body 26*a*. Around the periphery of the outer reel 26, is wound a transparent sheet 35 on which symbols of "star" 36, "BAR" 37, "WILD" 38 and so forth are arranged at random. The second symbol 39 for constituting the composition symbol "horse" 40 is also arranged on the transparent sheet 35. Meanwhile, a blank symbol corresponding to three symbols is provided between the symbol "WILD" 38 and the symbol "star" 36 arranged on the transparent sheet 35. The blank symbol is displayed through each of the display windows 3 to 5 at the beginning of the game to display the symbol of the inner reel 25 through the display window.

Figure 8:
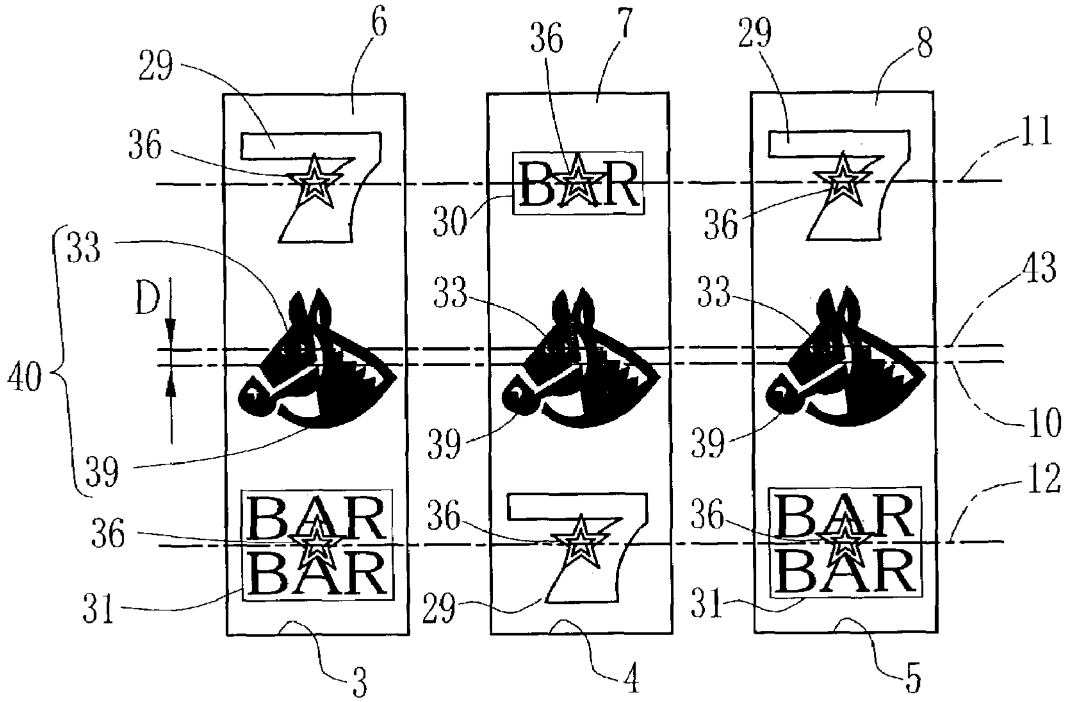
FIG. 8 is an explanatory illustration showing a display state in that a composition symbol stops at a central game line of the first to third reel units.
Figure 9:
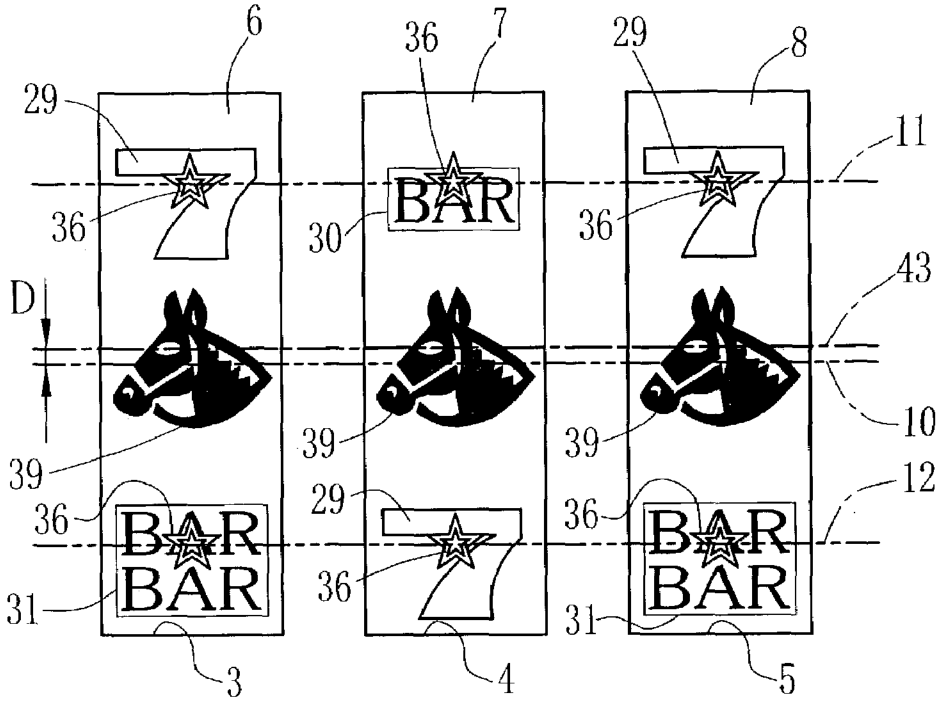
FIG. 9 is an explanatory illustration showing a display state in that a first symbol constituting the composition symbol is moved.

The composition symbol "horse" 40 is formed by combining the first symbol 33 of the inner reel 25 with the second symbol 39 of the outer reel 26. The composition symbol "horse" 40 is used as an attraction symbol, and is composed at the game line 10 by stopping the inner reel 25 and the outer reel 26 when a composition-symbol determining section 88 (see FIG. 4) determines to display the composition symbol "horse" 40. In this case, the first symbol 33 is adapted to stop at a position where the horse has a pupil such as shown in FIG. 8. This position is shifted from the game line by a predetermined amount D, and is hereinafter called as a reference position 43. Successively, the inner reel 25 is rotated in a forward direction, which is a rotating direction of the reel, by a predetermined number of drive pulses required for moving the first symbol 33 so as to be covered with the second symbol 39. After that, the inner reel 25 is rotated in a backward direction until the reference position 43. In other words, the first symbol 33 is moved in an upward direction by the amount D. By doing so, display (attraction) of the dynamic symbol is performed so as to change the pupil of the horse to be observed by a player. Incidentally, when the attraction for changing the pupil of the horse has been finished, the first symbol 33 stops at the reference position.

Similar symbol sheets are wound around the inner reels 25 and the outer reels 26 of the second reel unit 7 and the third reel unit 8. It is possible to properly change the kinds of the symbols to be arranged on the symbol sheet, the number thereof, and the arrangement order thereof. Moreover, the symbols may be different relative to the respective reels. Further, the kinds of winning and the odds may be properly determined.

The inner reel 25 and the outer reel 26 are integrally formed with attachment plates 45 and 46 respectively. The inner reel 25 and the outer reel 26 are respectively attached to a stepping motor via the attachment plates 45 and 46. Each of the second reel unit 7 and the third reel unit 8 is constituted of the inner reel and the outer reel similarly to the first reel unit 6. The inner reel is adapted to be observed through the outer reel. Since the second reel unit 7 and the third reel unit 8 have the structure similar to the first reel unit 6, the same reference numeral is used in the following description. Although all of the first to third reel units 6 to 8 have the double structure including the inner reel 25 and the outer reel 26, this is not exclusive. A number of the double-structure reels and positions thereof may be properly determined.

Figure 4:
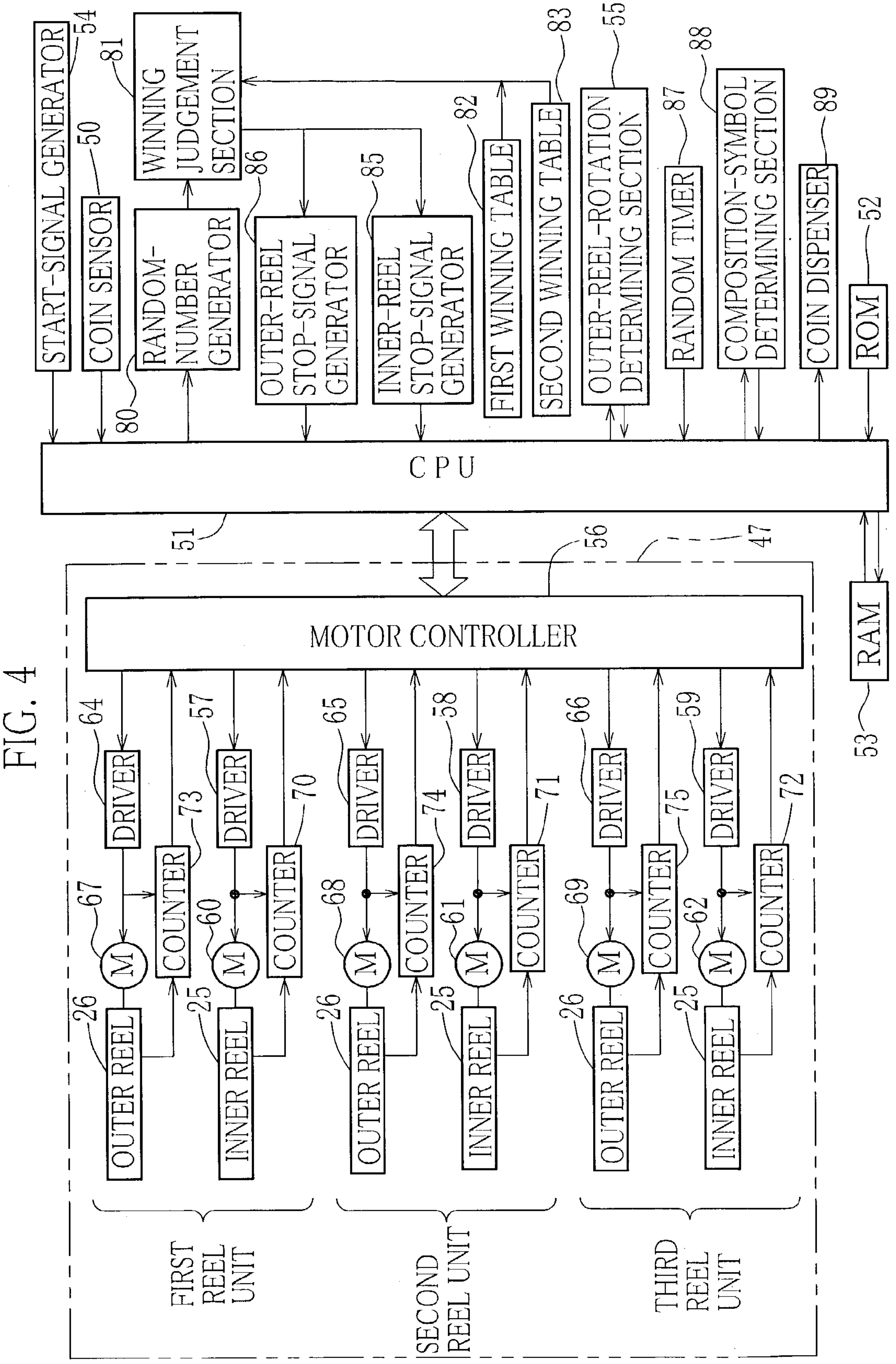
FIG. 4 is a block diagram showing an electrical structure of the slot machine.

As shown in FIG. 4, a coin sensor 50 disposed behind the coin slot 19 inputs a coin detection signal into a CPU 51 whenever insertion of the genuine coin is detected. The CPU 51 totally administers an operation of the slot machine 2 along a game program stored in a ROM 52. The CPU 51 invalidates an operation signal inputted without regard to game progress. Incidentally, the CPU 51 nominates all of the preset game lines upon receiving the coin detection signal, and stores the bet number in a RAM 53.

Upon operation of the start lever 15, a start-signal generator 54 is turned on to input a game-start signal into the CPU 51. In response to the game-start signal, the CPU 51 outputs an extraction-start signal to an outer-reel-rotation determining section 55 constituted of a random-number generator and a rotation decision table, which are not shown in the drawing. A random number is extracted from the random-number generator. Then, the extracted random number is checked with the rotation decision table to determine whether the outer reels 26 of the first to third reel units 6 to 8 are rotated or not. Incidentally, the CPU 51 outputs a motor start signal to a motor controller 56 despite whether or not the rotation of the outer reel 26 is caused by the outer-reel-rotation determining section 55. In response to the motor start signal, the motor controller 56 drives stepping motors 60 through 62 via drivers 57 through 59 to rotate the respective inner reels 25 of the first to third reel units 6 to 8. When the rotation of the outer reel 26 is determined in the outer-reel-rotation determining section 55, the CPU 51 outputs the motor start signal to the motor controller 56 after stopping all of the inner reels 25. In response to this motor start signal, the motor controller 56 drives stepping motors 67 through 69 via drivers 64 through 66 to rotate the respective outer reels 26 of the first to third reel units 6 to 8.

The stepping motors 60 to 62 and the stepping motors 67 to 69 are rotated in accordance with a number of the drive pulses inputted via the drivers 57 to 59 and the drivers 64 to 66. The respective stepping motors are rotated every unit step-angle.

The inner reel 25 and the outer reel 26 are respectively provided with a signal segment pointing a reference position. Rotation of the signal segment is monitored by a photointerruptor. Whenever each of the inner reel 25 and the outer reel 26 makes one rotation, a reset signal is obtained from the photointerruptor to reset each count value of counters 70 to 75 counting the number of the drive pulses. Thus, the count value of each of the counters 70 to 75 represents a rotational position within one rotation of the reel. The rotational positions of the inner reel 25 and the outer reel 26, which are defined when the reset signal is obtained, are known in advance. Moreover, the kinds and the order of the symbols arranged on the inner reel 25 and the outer reel 26 are also known in advance. Thus, by monitoring the numbers of the drive pulses supplied to the stepping motors 60 to 62 and 67 to 69, it is possible to distinguish the kinds of the symbols currently displayed in the display windows 3 to 5.

The CPU 51 activates a random-number generator 80 in accordance with the judgment of the outer-reel-rotation determining section 55 concerning whether the outer reel is rotated or not. Upon this, a single random number is extracted at random and is transferred to a winning judgment section 81 for checking the extracted random number by using either of a first winning table 82 and a second winning table 83. The first winning table 82 is used when only the inner reel 25 is rotated. The second winning table 83 is used when both of the inner reel 25 and the outer reel 26 are rotated.

In the respective winning tables, all of the random numbers generated by the random-number generator 80 are classified into a winning group and a loss group. The winning group of the random numbers is further divided into groups, one of which is for determining the game line to display the winning, and the other of which is for determining the kind of the symbol to be stopped on the game line. By referring to the winning table, the winning judgment section 81 can determine the occurrence of the winning at the time of extracting the random number. In the case of the occurrence of the winning, the winning judgment section 81 also determines the symbol combination to be displayed and the game line (winning line) for displaying this symbol combination.

The winning group of the second winning table 83 includes a first group, a second group and a third group. In the first group, only the symbols of the outer reel 26 are combined. In the second group, only the symbols of the inner reel 25 are combined. In the third group, the symbols of both the inner reel 25 and the outer reel 26 are combined. These groups are further divided into a few groups for determining the winning line and the symbols to be stopped on the winning line. Incidentally, the slot machine 2 is adapted so as not to simultaneously obtain two winning combinations, one of which is combined by the symbols of the inner reels 25 only, and the other of which is combined by the symbols of the outer reels 26 only.

When the inner reels 25 are merely rotated, the CPU 51 activates an inner-reel stop-signal generator 85. When the inner reels 25 and the outer reels 26 are rotated, the CPU 51 activates the inner-reel stop-signal generator 85 and an outer-reel stop-signal generator 86. The CPU 51 activates the stop-signal generators 85 and 86 on the basis of the winning and the loss, which are determined by checking the extracted random number with the winning table. In the case of the winning, the CPU 51 further activates the stop-signal generators 85 and 86 in accordance with the decided winning line and the symbols to be stopped thereon. In the case of the loss, the CPU 51 further activates the stop-signal generators 85 and 86 in accordance with the symbols to be stopped on the game line.

The inner-reel stop-signal generator 85 outputs inner-reel stop-position data, which represents rotational stop positions of the respective stepping motors 60 to 62, to the CPU 51 so as to stop the predetermined symbols on the game line in accordance with a result determined by extracting the random number. The inner-reel stop-position data is temporarily stored in the RAM 53. The CPU 51 counts passage of time from a moment that the game-start signal has been inputted from the start-signal generator 54, by means of a time counter which is not shown. When the passage of time reaches a preset reference time and count values of the counters 70 to 72 of the inner reels 25 coincide with the inner-reel stop-position data, an inner-reel stop signal is outputted toward the motor controller 56. Owing to this, the inner reels 25 of the first to third reel units 6 to 8 are stopped in turn.

As described above, the outer-reel stop-signal generator 86 is activated in the case that rotating the outer reel 26 is determined in the outer-reel-rotation determining section 55. Similarly to the inner-reel stop-signal generator 85, the outer-reel stop-signal generator 86 outputs outer-reel stop-position data, which represents rotational stop positions of the stepping motors 67 to 69, to the CPU 51 so as to stop the predetermined symbols on the game line in accordance with a result determined by extracting the random number. Incidentally, the outer-reel stop-position data is temporarily stored in the RAM 53.

A random timer 87 is activated after all of the inner reels 25 of the first to third reel units have been stopped and a predetermined period has passed from the rotation of the outer reel 26. And then, the random timer 87 generates, at random timing, three commencement signals for stopping the outer reels to input them into the CPU 51. In the case that the display of the composition symbol "horse" 40 is determined, the random timer 87 is activated in relation to the rotation of the outer reel 26, which is carried out after performing the attraction of the composition symbol "horse" 40. In response to this, the CPU 51 outputs an outer-reel stop signal to the motor controller 56 when the counters 73 to 75 of the outer reels 26 of the first to third reel units 6 to 8 coincide with the outer-reel stop-position data. Owing to this, the outer reels 26 of the first to third reel units 6 to 8 are stopped at random. When the game is over, the motor controller 56 drives the stepping motors 67 through 69 via the drivers 64 through 66 to rotate each outer reel 26 of the first to third reel units 6 to 8 by a certain amount. After that, the outer reels 26 are respectively stopped at a position where the blank symbol corresponding to three symbols is displayed in each of the display windows 3 to 5.

The composition-symbol determining section 88 is activated when the outer-reel-rotation determining section 55 determines to rotate the outer reel 26. Upon this, the composition-symbol determining section 88 determines whether the composition symbol "horse" 40 is displayed or not. In the case that the composition-symbol determining section 88 determines to display the composition symbol, the CPU 51 refers to symbol data, which is stored in the ROM 52 and represents the symbol arrangement of each reel, to determine the stop-position data of the first symbol 33 and the second symbol 39 constituting the composition symbol "horse" 40. After that, the CPU 51 stops the first symbols 33 of the inner reels 25 of the first to third reel units 6 to 8 at the reference position 43 of the central game line 10, via the motor controller 56. Further, the CPU 51 rotates the outer reels 26 via the motor controller 56 and stops them so as to align the second symbols 39 along the central game line 10. Owing to this, the composition symbol "horse" 40 is displayed on the central game line. Further, the display (attraction) of the dynamic symbol is performed such that the pupil of the horse is changed by vertically moving the first symbol 33.

A coin dispenser 89 pays out a prescribed number of coins in accordance with the winning symbol combination when it is confirmed that the winning symbol combination is displayed on the nominated game line.

Figure 5:
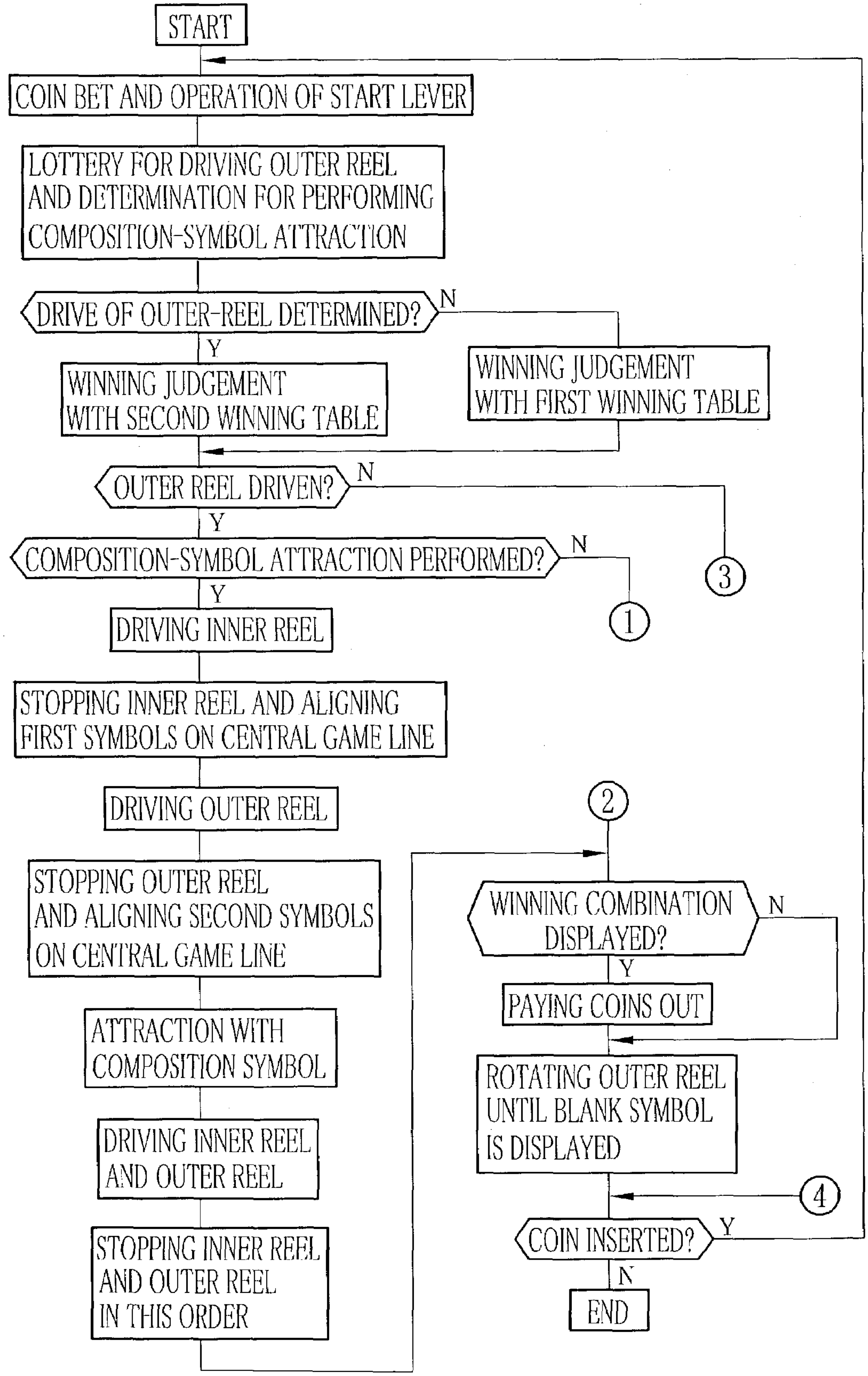
FIG. 5 is a flowchart showing a game sequence.
Figure 6:
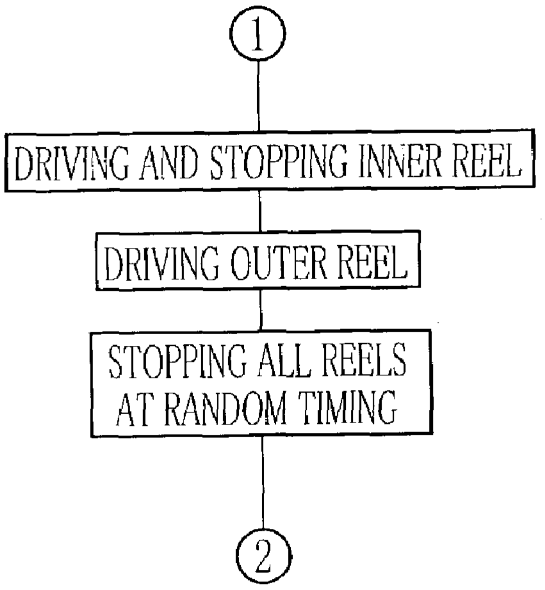
FIG. 6 is a flowchart showing a game sequence.
Figure 7:
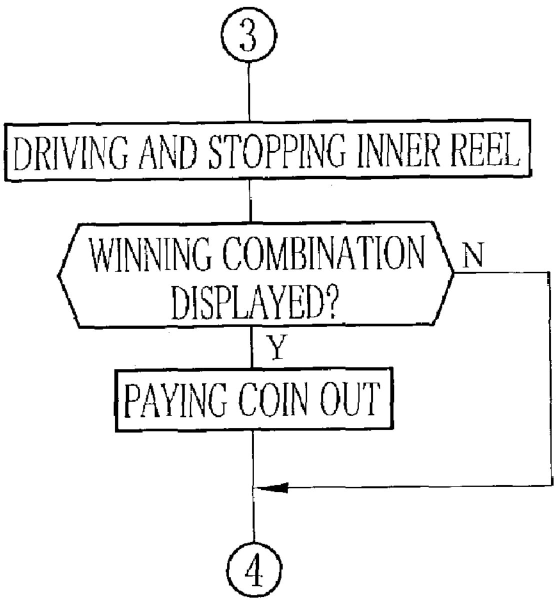
FIG. 7 is a flowchart showing a game sequence.

Next, an operation of the symbol displaying unit 47 built in the slot machine 2 is described below, referring to flowcharts of FIGS. 5 to 7. The player inserts a certain number of coins into the coin slot 19 and bets the coin by pressing either of the one-bet button 16 and the max-bet button 17. At this time, all of the game lines 10 to 12 are nominated. However, the game lines 10 to 12 may be nominated in accordance with the number of the inserted coins. Successively, the player operates the start lever 15. In response to this operation, the CPU 51 rotates all of the inner reels 25 of the first to third reel units 6 to 8 via the motor controller 56. The CPU 51 simultaneously activates the outer-reel-rotation determining section 55 to determine whether the outer reels 26 are rotated or not. On the basis of the determination of the outer-reel-rotation determining section 55, the composition-symbol determining section 88 is activated to determine whether or not the composition symbols "horse" 40 are displayed in the display windows 3 to 5. At the same time, the CPU 51 activates the random-number generator 80 to extract the random number. In response to this, the winning judgment section 81 determines either of the winning and the loss from the extracted random number and the winning table selected on the basis of the determination of the outer-reel-rotation determining section 55.

When the outer-reel-rotation determining section 55 determines to rotate the outer reels 26 of the first to third reel units 6 to 8, the composition-symbol determining section 88 determines whether the composition symbol "horse" 40 is displayed or not. Meanwhile, the winning judgment section 81 executes the winning judgment by using the second winning table 83. When the composition-symbol determining section 88 determines to display the composition symbol "horse" 40, the CPU 51 stops the inner reels 25 of the first to third reel units 6 to 8 in turn after a predetermined period so as to align the first symbols 33 along the reference position 43 of the central game line 10. After stopping all of the inner reels 25, the CPU 51 rotates the outer reels 26 of the first to third reel units 6 to 8 via the motor controller 56 and stops them after a predetermined period so as to align the second symbols 39 on the central game line. Such as shown in FIG. 8, the composition symbols "horse" 40 of the first to third reel units 6 to 8 are aligned on the central game line 10.

When the composition symbols "horse" 40 of the first to third reel units 6 to 8 are aligned on the central game line 10, the motor controller 56 rotates the stepping motors 60 to 62 via the drivers 57 to 59 in the forward direction by an amount corresponding to a predetermined step number, and after that, the motor controller 56 rotates the stepping motors in the backward direction by the amount corresponding to the predetermined step number. This operation is repeated predetermined times. In virtue of this, the first symbol 33 is vertically moved within a predetermined range so that the composition symbol "horse" 40 may simulate a motion that the pupil of the horse is changed.

After rotating the inner reels 25 in the forward direction and in the backward direction, the inner reels 25 and the outer reels 26 of the first to third reel units 6 to 8 are rotated again. The CPU 51 refers to the stop-position data of the inner reel stored in the RAM 53, and stops all of the inner reels 25 so as to align the symbols, which are determined by the winning judgment section 81, on the predetermined game line. After that, the CPU 51 stops all of the outer reels 26 by turn in response to the outer-reel stop signal, which is outputted from the random timer 87 activated upon rotating the outer reel 26 again. When the winning symbol combination stops on any of the game lines after stopping all of the inner reels 25 and the outer reels 26 of the first to third reel units 6 to 8, the dividend number of coins are paid to the tray 20. The dividend number is calculated such that the number of the coins bet at the commencement of the game is multiplied by the odds. After stopping all the reels, the outer reels 26 are rotated and are stopped at the position where the blank symbol corresponding to the three symbols is displayed through the display window.

Meanwhile, in the case that the outer-reel-rotation determining section 55 determines to rotate the outer reel and the composition-symbol determining section 88 determines not to display the composition symbol "horse" 40, the winning judgment section 81 performs the winning judgment by using the second winning table 83. In this case, only the inner reels 25 of the first to third reel units are rotated and these inner reels 25 are stopped in turn after a predetermined period. Upon stopping all the inner reels 25, the outer reels 26 are rotated, and then, are stopped at random. When a winning symbol combination stops at any of the game lines, a dividend number of coins are paid out to the tray 20. The dividend number is calculated such that the number of coins bet at the commencement of the game is multiplied by the odds determined in accordance with the winning. After stopping all the reels, the outer reels 26 are rotated and are stopped at the position where the blank symbol corresponding to three symbols is displayed through the respective display windows 3 to 5.

In the case that the outer-reel-rotation determining section determines not to rotate the outer reel 26, the winning judgment section 81 performs the winning judgment by using the first winning table. In this case, the dividend number of coins are paid out to the tray 20 only when the symbol combination stopped at the game line corresponds to the winning.

In the present embodiment, when the outer-reel-rotation determining section 55 determines to rotate the outer reel, whether the composition symbol "horse" 40 is displayed or not is determined without regard to the winning and the loss of the current game. However, this is not exclusive. For instance, whether the composition symbol "horse" 40 is displayed or not may be determined when the winning judgment section 81 determines the winning. In another way, whether the composition symbol "horse" 40 is displayed or not may be determined only when the odds of the winning becomes high. In this case, it is possible to give the player a feeling of anticipation relative to the high-dividend winning, by the attraction that the pupil of the horse is changed after displaying the composition symbol "horse" 40.

It is unnecessary to stop the first symbol at the reference position 43 when moving the first symbol in the vertical direction. The stop position of the first symbol may be properly determined in consideration of the game attraction. For instance, the stop position of the first symbol may be changed in accordance with a possibility of the winning after performing the attraction of the dynamic symbol of the composition symbol "horse" 40. In this case, when the possibility of the winning is strong, the first symbol 33 is stopped at the position (reference position 43) so as to set the pupil to the horse after performing the attraction of the composition symbol "horse" 40. Meanwhile, when the possibility of the winning is weak, the first symbol 33 is stopped at a position, where the first symbol 33 is covered with the second symbol 39, so as to make the eye of the horse white. When the attraction of the composition symbol "horse" 40 has been performed, it is necessary to confirm the position of the first symbol 33 so that a tense feeling for the game may be given to the player. Moreover, the anticipation of the winning may be also given. Further, when displaying the composition symbols "horse" 40 at all of the first to third reel units, combinations to the stop positions of the first symbol 33 increase by individually setting these stop positions. Therefore, it is possible to diversify the possibility of the winning. By the way, it is not exclusive to display the composition symbols "horse" 40 at all of the first to third reel units 6 to 8. For instance, the composition symbol "horse" 40 may be optionally used such that it is displayed only by the first reel unit 6 or is displayed by the first reel unit 6 and the third reel unit 8. Also, the display position is not exclusive to the present embodiment. It is possible to properly set the display position to an upper portion of the respective reels, a lower portion thereof, and so forth.

In the present embodiment, when the composition symbol is displayed, only the inner reel is rotated to perform the attraction of the dynamic symbol. However, this is not exclusive. For instance, the outer reel may be rotated forward and backward by a predetermined angle.

Figure 10:
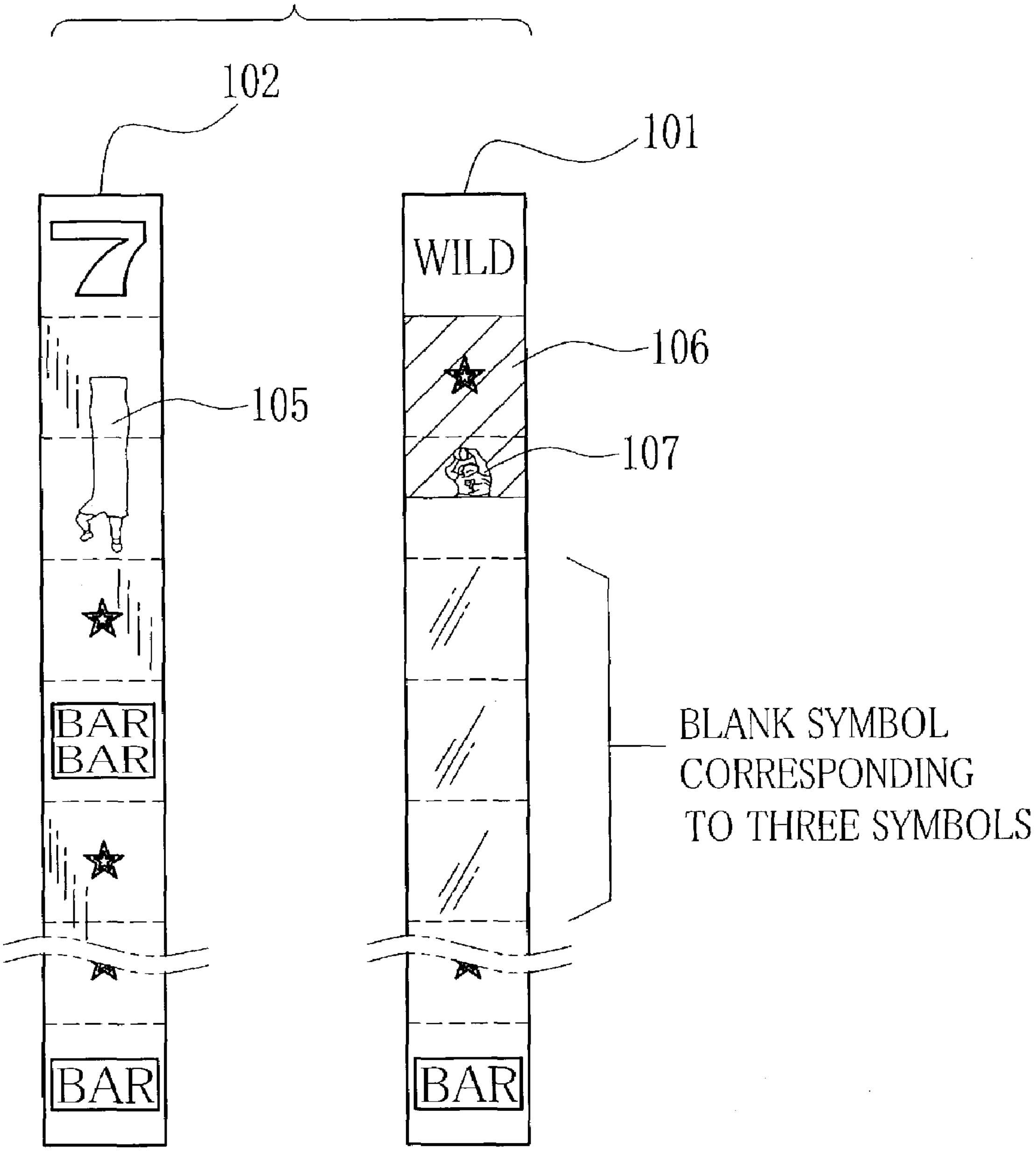
FIG. 10 is an explanatory illustration showing a symbol arrangement in which a symbol of the inner reel is formed in a scope exceeding one frame.

In the present embodiment, although the composition symbol is used as the attraction symbol, the composition symbol may be used as the symbol participating in the winning. Such as shown in FIG. 10, a transparent sheet 101 wound around the outer reel is divided into a number of symbols arranged thereon. A symbol sheet 102 of the inner reel is similarly divided into a number of symbols arranged thereon. Hereinafter, the divided portion is called as frame. The symbols are formed in the frames one by one. Incidentally, symbol arrangement shown in FIG. 10 is an example. This arrangement is not exclusive but may be properly changed.

In this embodiment, a first symbol 105 is formed on the symbol sheet 102 of the inner reel within a range of one and a half frames, which is constituted of one frame and a half frame upwardly succeeding thereto. On the transparent sheet 101 of the outer reel, is formed an opaque portion 106 of one and a half frames constituted of one frame and a half of an under frame thereof. A second symbol 107 is formed within a range of the half frame occupying the lower area of the opaque portion 106. A first composition symbol 110 (see FIG. 11) is formed when the composition symbol constituted of the first symbol 105 and the second symbol 107 has a size corresponding to one symbol. A second composition symbol 111 (see FIG. 12) is formed when the composition symbol of the first symbol 105 and the second symbol 107 has a size corresponding to two symbols. In the case that the first composition symbol 110 is formed, an upper portion of the first symbol 105 is covered with the opaque position 106 on which the second symbol 107 is formed. Thus, the first composition symbol 110 is clearly displayed. Meanwhile, the second composition symbol 111 has the size corresponding to two symbols and is displayed so as to stride two game lines. The displayed second composition symbol 111 is regarded as a couple of the first composition symbols 110.

Figure 11:
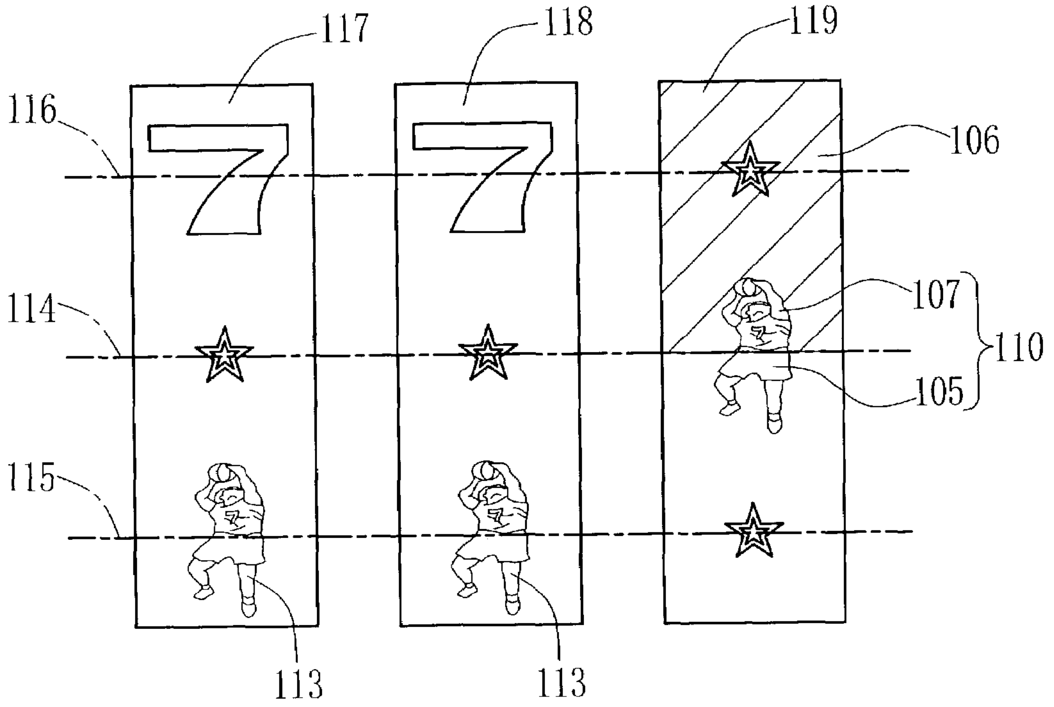
FIG. 11 is an explanatory illustration showing a display state in that a first composition symbol of a second embodiment is formed on the central game line.
Figure 12:
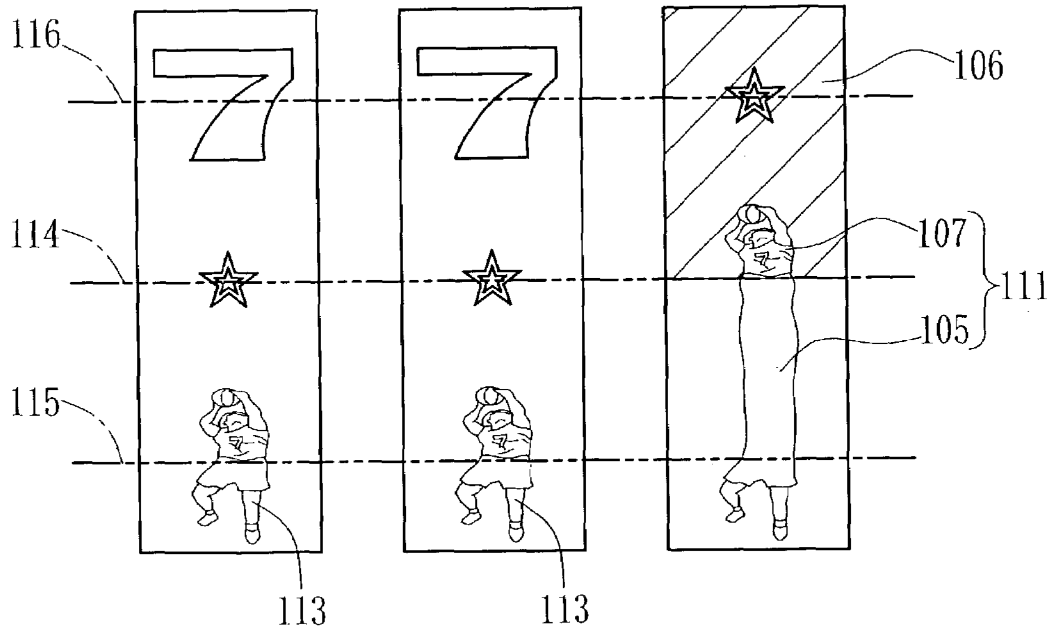
FIG. 12 is an explanatory illustration showing a display state in that a second composition symbol of the second embodiment is displayed from the central game line to the lower game line.

FIG. 11 shows a case in that a first reel unit 117 and a second reel unit 118 respectively display a symbol 113, a figure of which is identical with the first composition symbol 110, at a lower game line 115. Further, an inner reel and an outer reel of a third reel unit 119 are stopped so as to display the first composition symbol 110 at a central game line 114. In this case, if the inner reel of the third reel unit 119 is stopped as it is, the game is over without winning. By contrast, in a case that the inner reel of the third reel unit 119 is rotated in the forward direction after stopping the first to third reel units 117 to 119, an upper portion of the first symbol 105 covered with the opaque portion 106 of the outer reel emerges to change the symbol display from the first composition symbol 110 to the second composition symbol 111. Owing to this, an animation is displayed so as to extend a body of the figure. In other words, is executed an animation display mode in which a symbol-display state is dynamically changed by a combination of the symbols of the inner reel and the outer reel. In this case, the second composition symbol 111 is formed so as to extend from the central game line 114 to the lower game line 115. Thus, the winning occurs so that a predetermined number of coins are paid out. By dynamically changing the symbol display, it is possible to award the player the anticipation of the winning. Further, it is also possible to diversify winning forms.

In this embodiment, besides changing the display from the first composition symbol 110 to the second composition symbol 111, the display may be changed from the second composition symbol 111 to the first composition symbol 110. Alternatively, the display may be returned to the first composition symbol 110 by reversing the inner reel on the way when rotating the inner reel in the forward direction to change the display from the first composition symbol to the second composition symbol. Owing to this, the attraction of the game is performed, and at the same time, the anticipation of the winning is given to the player. Incidentally, a third composition symbol may be provided so as to cover all of the game lines 114 to 116, although this is not shown in the drawings. In this case, the display may be changed from the first composition symbol 110 to the third composition symbol. In another way, the display may be changed from the second composition symbol 111 to the third composition symbol.

Figure 13:
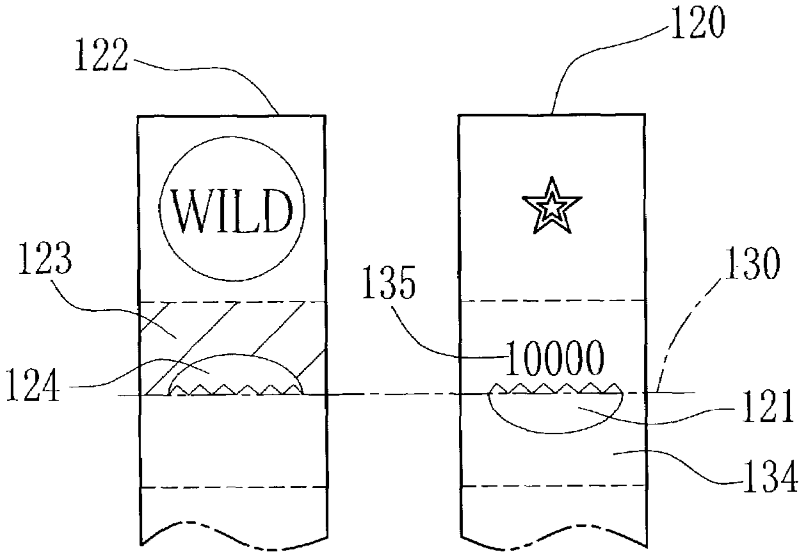
FIG. 13 is an explanatory illustration showing a symbol arrangement in which a composition symbol of a third embodiment participates in a winning combination.
Figure 14:
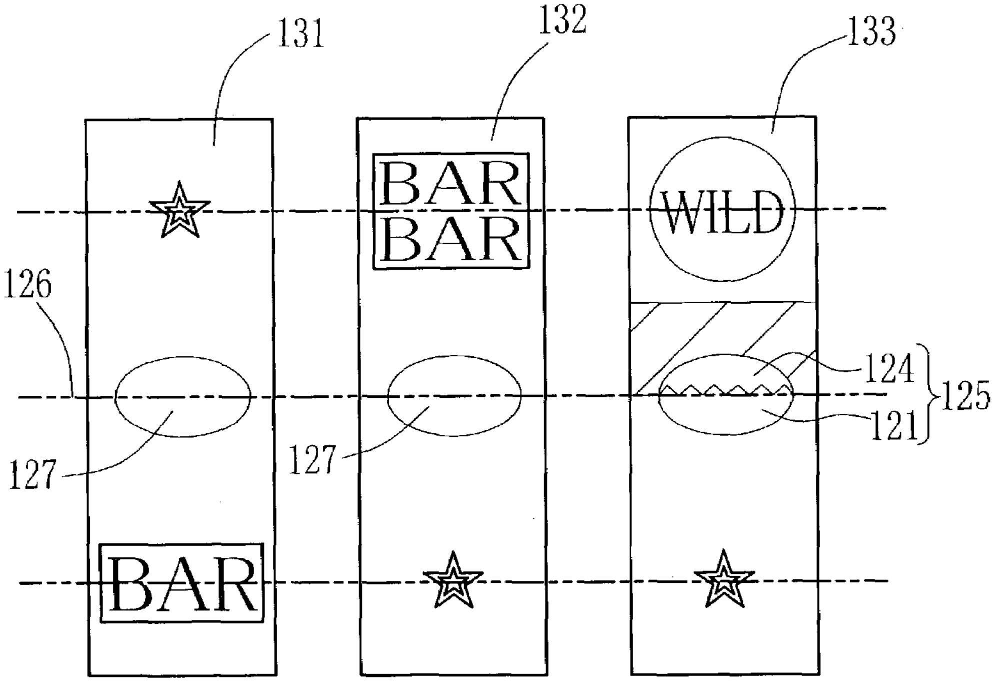
FIG. 14 is an explanatory illustration showing a display state in that a first composition symbol of the third embodiment stops on the central game line.

In the case that the display is changed from the first composition symbol 110 to the second composition symbol 111, the odds and the dividend number of coins to be obtained may be changed. In this case, as shown in FIG. 13, a first symbol 121 and a symbol "10000" 135 are arranged within a frame defined on a symbol sheet 120 of the inner reel. Moreover, an upper half of a frame defined on a symbol sheet 122 of the outer reel is formed so as to be an opaque portion 123. A second symbol 124 is arranged on this opaque portion 123. When the first symbol 121 is overlapped with the second symbol 124 at a reference position 130, a first composition symbol 125 of "egg" is composed. As shown in FIG. 14, there sometimes occurs a state in that a first reel unit 131 through a third reel unit 133 are stopped so as to align symbols 127 of "egg" and the first composition symbol 125 at a central game line 126. At this time, a winning symbol combination of "egg-egg-egg" occurs so that coins are paid out in accordance with the predetermined odds.

Figure 15:
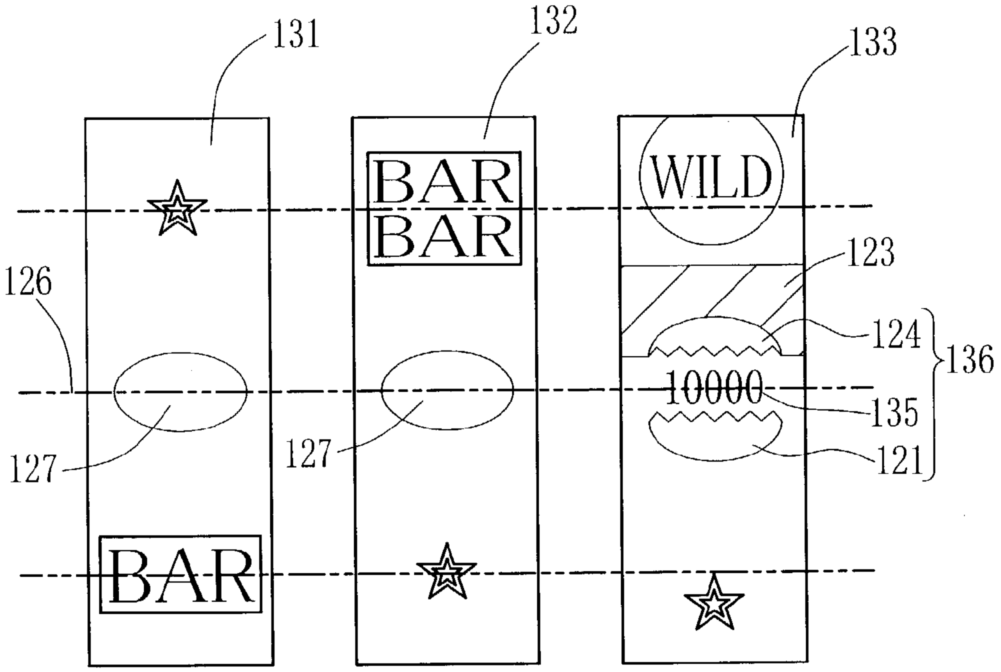
FIG. 15 is an explanatory illustration showing a display state in that a second composition symbol of the third embodiment stops at the central game line.

After the symbol combination of "egg-egg-egg" has been displayed on the central game line 126, the inner reel of the third reel unit 133 is rotated by a predetermined angle in a forward direction (downward direction in the drawing), and the outer reel thereof is rotated by a predetermined angle in a backward direction (upward direction in the drawing). As shown in FIG. 15, the first symbol 121 and the second symbol 124 are respectively moved upon rotations of the inner reel and the outer reel to display the symbol 135 of "10000", which is written in the frame 134 having the first symbol 121 arranged therein. In this way, the symbol display is changed to a second composition symbol 136 constituted of the first symbol 121, the second symbol 124 and the symbol 135 of "1000". The numeral indicated by moving the first symbol 121 and the second symbol 124 becomes the odds so that coins of high dividend are obtained. By simultaneously moving the first symbol 121 and the second symbol 124, the attraction of the dynamic symbol is performed such that the first composition symbol 125 of "egg" is opened. At the same time, game interests relative to the unexpected result, fun and so forth are given to the player.

In this embodiment, a single composition symbol is formed from the first symbol arranged on the inner reel and the second symbol arranged on the outer reel. At least one of the first symbol and the second symbol is moved to perform the display of the dynamic symbol. However, this is not exclusive. The dynamic symbol may be displayed by the other symbols of the inner reel and the outer reel excluding the symbols constituting the composition symbol. For instance, a symbol "rock" 143 and a blank symbol corresponding to three symbols are arranged on the respective outer reels of a first reel unit 140 through a third reel unit 142. The outer reels of the first to third reel units 140 to 142 are stopped so as to display the three blank symbols through display windows 144 to 146 at the beginning of the game.

Figure 16:
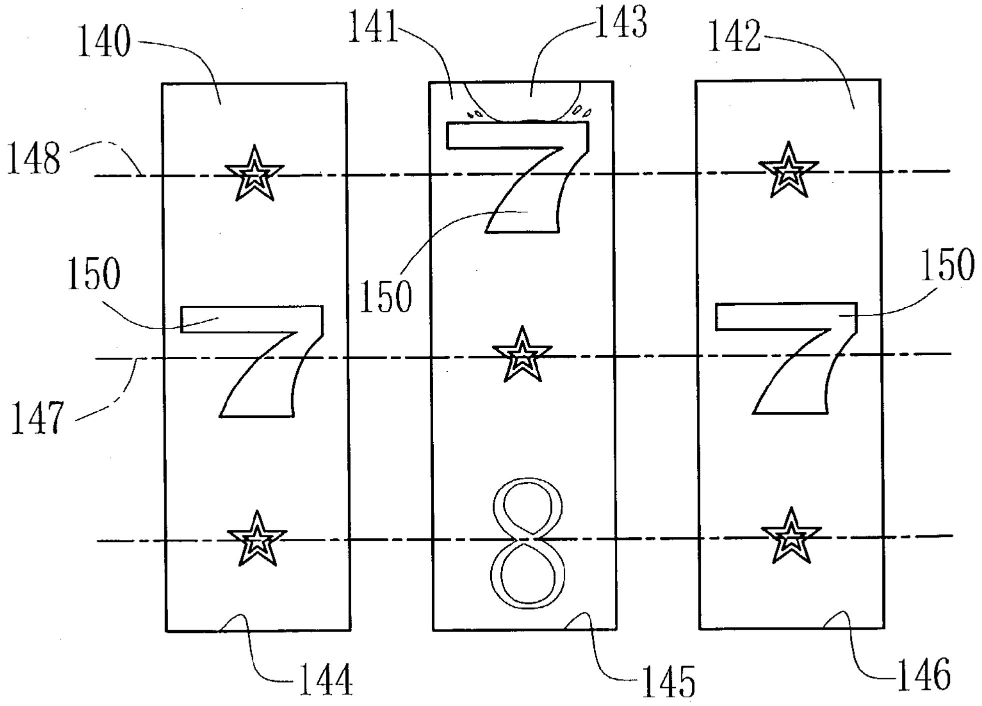
FIG. 16 is an explanatory illustration showing a display state in that a composition symbol of a fourth embodiment is not formed from the symbols of the outer reel and the inner reel.
Figure 17:
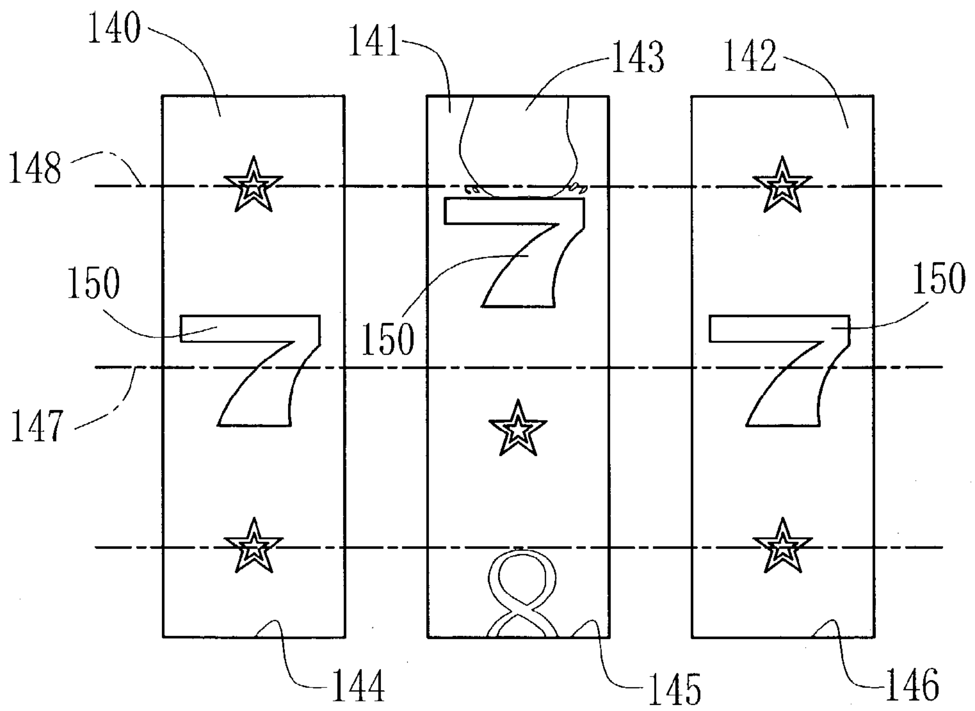
FIG. 17 is an explanatory illustration showing a state in that a symbol "rock" of the outer reel pushes a symbol "7" of the inner reel.

When the game is started and the winning is determined to be caused such that the symbol combination of "7-7-7" is displayed on the central game line 147, a symbol combination of "7-star-7" is temporarily stopped on the central game line. After that, as shown in FIG. 16, the outer reel of the second reel unit 141 is rotated and is stopped at a position where the symbol "rock" 143 abuts on the symbol "7" 150 of the inner reel stopping at an upper game line 148. At this time, an impact sound of a collision is generated and the inner reel is moved up and down as if the symbol "7" 150 receives a shock. As shown in FIG. 17, after the heave of the inner reel has been stopped, the inner reel and the outer reel are gradually rotated in the forward direction (downward direction in the drawing). In virtue of this, the symbol "7" 150 of the inner reel seems to be pushed by the symbol "rock" 143 of the outer reel. Incidentally, when moving the symbols, the player may receive an impression that the symbol "rock" 140 gives a shock to the symbol "7" 150, by vibrating the symbol "7" 150 and the symbol "rock" 143 during the movement to the central game line 147.

Figure 18:
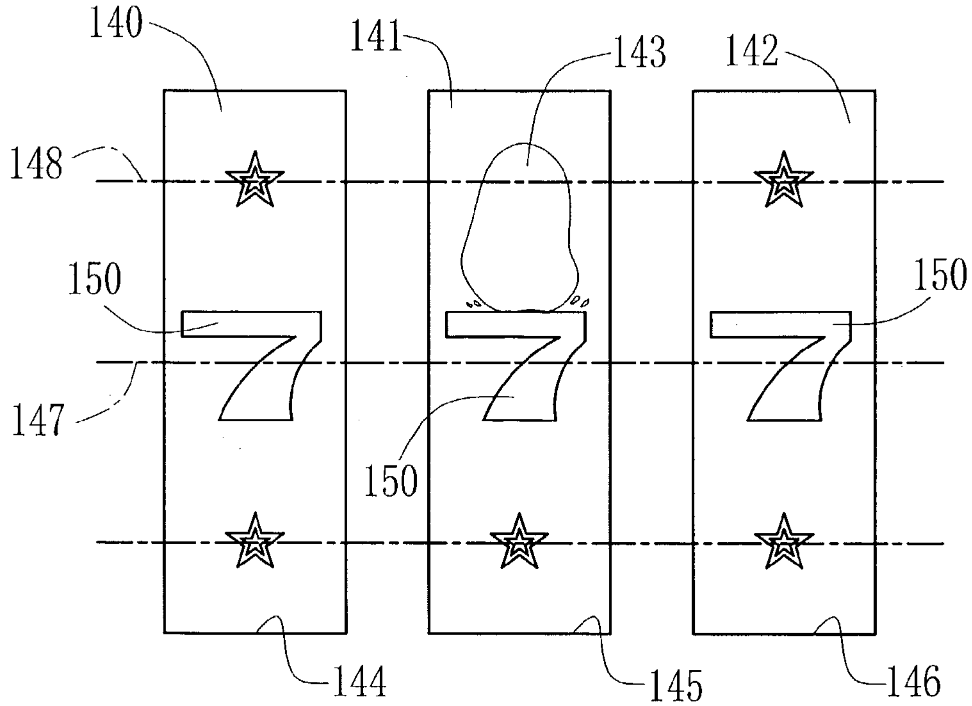
FIG. 18 is an explanatory illustration showing a state in that the symbol "7" of the inner reel is pushed by the symbol "lock" of the outer reel until the central game line.
Figure 19:
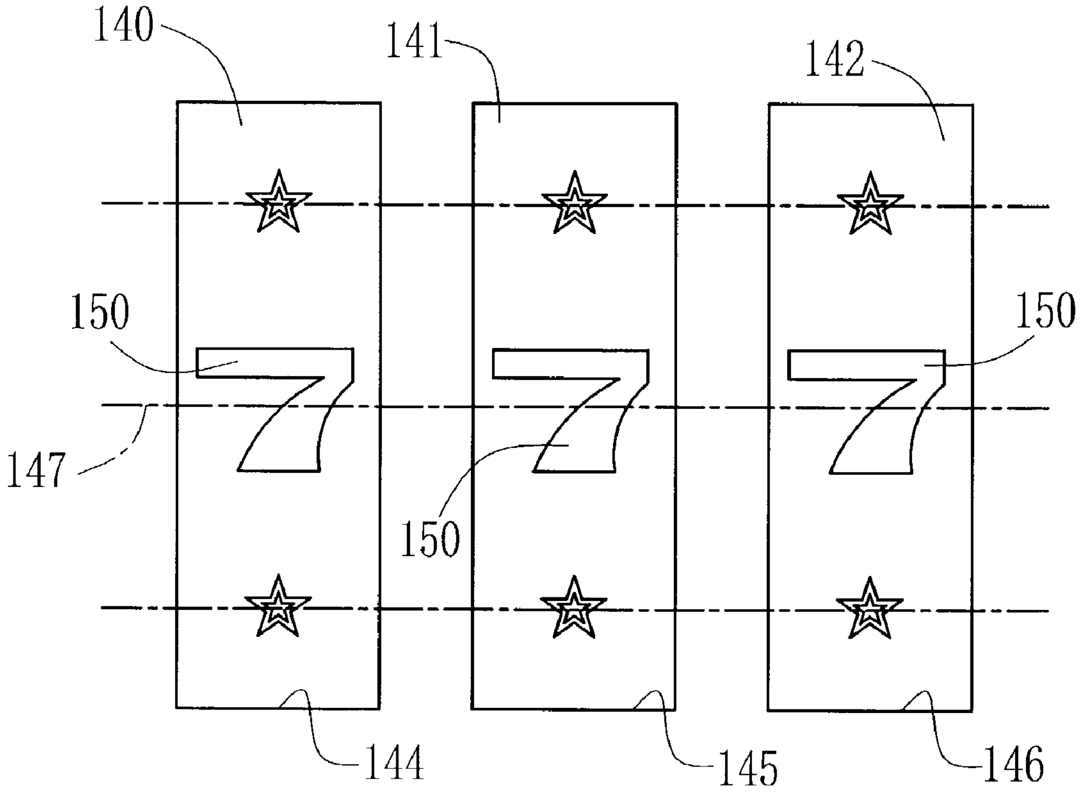
FIG. 19 is an explanatory illustration showing a state in that all the reels are stopped at a position where the symbol "7" is displayed.

Upon moving the symbol "7" 150 to the central game line 147 as shown in FIGS. 18 and 19, the inner reel and the outer reel of the second reel unit 141 stop rotating. After that, the outer reel is rotated again and is stopped at the position where the blank symbol corresponding to three symbols is displayed. Consequently, the symbol combination of "7-7-7" is displayed on the central game line 147 so that the winning occurs. Coins are paid out in accordance with the obtained winning. In this way, it is possible to perform the display of the dynamic symbol by using the symbols, which do not constitute the composition symbol. Also in this case, interests relative to the game may be given to the player. Incidentally, the symbols of the inner reel and the outer reel, which do not constitute the composition symbol, are not exclusive to the above symbols. It is possible to properly set the game attraction, the kinds of symbols, the arrangement of the symbols, and so forth.

In this embodiment, the blank symbol corresponding to three symbols of the outer reel is displayed. However, this is not exclusive. The inner reel may be rotated and stopped at the position where the symbol of the outer reel is displayed. In this case, a plurality of winning tables to be used are provided so as to correspond to stop states of the outer reel. The winning table to be used is selected in accordance with the stop state of the outer reel. Moreover, in the above embodiment, when the outer-reel-rotation determining section determines to rotate the outer reel, the outer reel is rotated after rotating and stopping the inner reel. The outer reel, however, may be rotated and stopped on ahead. In another way, the inner reel and the outer reel may be simultaneously rotated. It is possible to properly set timing and a manner for starting and stopping the rotation of the reel. Further, the way of moving the inner reel and the outer reel for performing the animation display is not exclusive to the above embodiments. It is possible to optionally modify the moving way within a scope of the present invention.

In the above embodiment, forms of the first symbol and the second symbol to be composed are briefly described. Sometimes, the composition symbol is disturbed to be displayed in a good stack state due to a disposition relationship between the inner reel and the outer reel. In view of this, the symbol of the inner reel may be formed so as to be larger than the symbol of the outer reel. Moreover, the first symbol and the second symbol may be provided with an overlap portion to partially overlap the first and second symbols when displaying the composition symbol.

In the above embodiment, either of the winning and the loss is judged from the outset on the basis of the extracted random number. The stop control of the respective reels is performed so as to display the symbol combination in accordance with the judgment result. However, this is not exclusive. The symbol to be displayed with each of the reels (including the inner reel and the outer reel) may be decided in accordance with the individually extracted random number to display the symbol combination on the basis of this decision. At this time, the winning judgment is performed, referring to the displayed symbol combination.

In the above embodiment, the symbol displaying unit is built in the slot machine. However, the symbol displaying unit may be built in a Japanese upright pinball machine and the other game machine, instead of the slot machine.

Finally, in the forgoing embodiment, the outer reel is adapted to be transparent as a whole. The outer reel, however, is sufficient to be partially transparent for observing the inner reel. Incidentally, in the animation display mode, one of the outer reel and the inner reel is rotated in the forward and backward directions by predetermined times within the predetermined range. However, one of the outer reel and the inner reel may be rotated in the forward direction and/or the backward direction.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A symbol displaying unit used for a game machine in which winning and loss are determined in accordance with a kind of a symbol combination completed on a game line crossing display windows, said symbol displaying unit including:

a plurality of reel units disposed so as to intersect said game line, at least one of the reel units having a double-reel structure comprising an inner reel and an outer reel, which are coaxially and individually rotated, and at least a part of said outer reel being transparent;

at least one outer symbol carried on a peripheral surface of said outer reel;

a plurality of inner symbols carried on a peripheral surface of said inner reel, said inner symbol being observable through said outer reel; and animation-display-mode executing means for executing a dynamic animation display mode, at least one of the outer reel and the inner reel being rotated in the animation display mode to dynamically alter a symbol-display state of a combination of the inner symbol and the outer symbol, while maintaining a previous display combination.

2. A symbol displaying unit according to claim 1, wherein the animation-display-mode executing means rotates at least one of one of the outer reel and the inner reel in forward and backward directions within a predetermined range.

3. A symbol displaying unit according to claim 1, wherein the animation-display-mode executing means rotates both of the outer reel and the inner reel.

4. A symbol displaying unit according to claim 3, wherein the animation-display-mode executing means rotates the outer reel and the inner reel in the same direction.

5. A symbol displaying unit according to claim 3, wherein the animation-display-mode executing means rotates the outer reel and the inner reel in opposite directions.

6. A symbol displaying unit according to claim 1, wherein the outer symbol and the inner symbol constitute a single composition symbol.

7. A symbol displaying unit according to claim 1, wherein at least one of the inner reel and the outer reel is rotated again after completion of the animation display mode.

8. A symbol displaying unit according to claim 1, wherein the animation-display-mode executing means includes a first stepping motor for rotating the inner reel, and a second stepping motor for rotating the outer reel.

9. A symbol displaying unit used for a game machine in which winning and loss are determined in accordance with a kind of a symbol combination completed on a game line crossing display windows, said symbol displaying unit including:

a plurality of reel units disposed so as to intersect said game line, at least one of the reel units having a double-reel structure comprising an inner reel and an outer reel, which are coaxially and individually rotated, and at least a part of said outer reel being transparent;

at least one extra symbol carried on a peripheral surface of said outer reel;

a plurality of inner symbols carried on a peripheral surface of said inner reel, said inner symbol being observable through said outer reel; and animation-display-mode executing means for executing an animation display mode, either of the outer reel and the inner reel being rotated in the animation display mode to dynamically change a symbol-display state by a combination of the inner symbol and the extra symbol, while maintaining a previous display combination.

10. A symbol displaying unit according to claim 9, wherein a number of said reel units is three.

11. A symbol displaying unit according to claim 10, wherein said reel units are disposed in a horizontal direction.

12. A symbol displaying unit, comprising:

a plurality of reel units disposed so as to intersect a game line that crosses a display window, at least one of said plural reel units having a double-reel structure comprising an inner reel and an outer reel;

a plurality of symbols carried on a peripheral surface of said inner reel and said outer reel, an inner symbol being observable through said outer reel; and animation-display-mode executing means for continuously changing a display of a combination of said inner symbol and an outer symbol, while maintaining a previous display combination.

* * * * *